United States Patent
Soto (10) Patent No.: US 9,821,386 B2
(45) Date of Patent: Nov. 21, 2017

(54) SEMI-AUTOMATIC PIPE CUTTER

(71) Applicant: Jose Severiano Soto, Bowling Green, KY (US)

(72) Inventor: Jose Severiano Soto, Bowling Green, KY (US)

(*) Notice: Subject to any disclaimer, the term of this patent is extended or adjusted under 35 U.S.C. 154(b) by 436 days.

(21) Appl. No.: 14/659,696

(22) Filed: Mar. 17, 2015

(65) Prior Publication Data

US 2015/0266115 A1    Sep. 24, 2015

Related U.S. Application Data

(60) Provisional application No. 61/968,300, filed on Mar. 20, 2014.

(51) Int. Cl.
| | |
|---|---|
| *B23D 21/00* | (2006.01) |
| *B23D 21/08* | (2006.01) |
| *B23B 5/14* | (2006.01) |
| *B23D 45/12* | (2006.01) |

(52) U.S. Cl.
CPC ............ *B23D 21/006* (2013.01); *B23D 21/00* (2013.01); *B23B 5/14* (2013.01); *B23D 21/08* (2013.01); *B23D 45/124* (2013.01); *Y10T 83/242* (2015.04)

(58) Field of Classification Search
CPC ...... B23B 5/14; B23D 45/124; B23D 45/065; B23D 45/042; Y10T 82/16
USPC ...................... 30/93, 97, 100–102
See application file for complete search history.

(56) References Cited

U.S. PATENT DOCUMENTS

| | | | | |
|---|---|---|---|---|
| 2,195,568 | A * | 4/1940 | Hexdall | B23G 1/22 30/97 |
| 2,389,463 | A | 11/1945 | Smotzer | |
| 2,563,483 | A * | 8/1951 | O'Hagan | B23D 21/08 15/104.04 |
| 3,242,566 | A | 3/1966 | White | |
| 3,355,749 | A * | 12/1967 | Steffen | B23D 21/08 30/102 |
| 3,507,035 | A * | 4/1970 | Mann, Jr. | B23D 21/00 29/564 |
| 4,072,073 | A * | 2/1978 | Birkestrand | B23D 21/00 82/101 |
| 4,349,928 | A * | 9/1982 | Mlikotin | B23D 21/08 30/378 |
| 5,142,825 | A * | 9/1992 | Floyd | B23D 45/006 30/102 |
| 5,829,142 | A * | 11/1998 | Rieser | B23D 21/08 30/93 |
| 6,336,270 | B1 * | 1/2002 | Dureiko | B23D 29/00 30/102 |
| 6,581,499 | B2 | 6/2003 | Myers | |
| 6,698,048 | B1 | 3/2004 | Greene | |
| 7,556,556 | B1 * | 7/2009 | McDonald | B24B 5/40 15/104.095 |

(Continued)

FOREIGN PATENT DOCUMENTS

WO    WO2000067925 A1    11/2000

*Primary Examiner* — Sunil K Singh
*Assistant Examiner* — Ryan Rufo
(74) *Attorney, Agent, or Firm* — Kyle A. Fletcher, Esq.

(57) ABSTRACT

The semi-automatic pipe cutter is an electrically powered pipe cutter. The semi-automatic pipe cutter comprises a pipe cutter wheel, an electric motor, a plurality of wire cleaning brushes, a gearing system, a frame, a left pipe driver, a right pipe driver and a pipe channel.

17 Claims, 6 Drawing Sheets

(56) References Cited

U.S. PATENT DOCUMENTS

| | | | |
|---|---|---|---|
| 7,752,699 B1* | 7/2010 | Fruzzetti, Jr. | B08B 1/04 |
| | | | 15/104.04 |
| 7,823,235 B2 | 11/2010 | Parish | |
| D639,628 S | 6/2011 | Zhou | |
| 8,033,024 B2 | 10/2011 | Goop | |
| 2002/0148333 A1* | 10/2002 | Myers | B23D 21/00 |
| | | | 82/113 |
| 2003/0121155 A1* | 7/2003 | Walsh | B26D 3/169 |
| | | | 30/97 |
| 2007/0214648 A1* | 9/2007 | Lazarevic | B23D 21/04 |
| | | | 30/102 |
| 2010/0122423 A1 | 5/2010 | Lozar | |

* cited by examiner

SEMI-AUTOMATIC PIPE CUTTER

CROSS REFERENCES TO RELATED APPLICATIONS

This non-provisional application claims priority to provisional application 61/968,300 that was filed on Mar. 20, 2014.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pipe cutters, more specifically, an accessory configured for semiautomatic pipe cutting operation.

SUMMARY OF INVENTION

The semi-automatic pipe cutter is a portable electrically powered pipe cutter comprising a pipe cutter wheel, an electric motor, a plurality of wire cleaning brushes, a gearing system, a frame, a left pipe driver, a right pipe driver and a pipe channel.

These together with additional objects, features and advantages of the semi-automatic pipe cutter will be readily apparent to those of ordinary skill in the art upon reading the nonetheless illustrative, embodiments when taken in conjunction with the accompanying drawings.

In this respect, before explaining the current embodiments of the semi-automatic pipe cutter in detail, it is to be understood that the semi-automatic pipe cutter is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the semi-automatic pipe cutter.

It is therefore important that the claims be regarded as including such equivalent construction insofar as they do not depart from the spirit and scope of the semi-automatic pipe cutter. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The semi-automatic pipe cutter 100 (hereinafter invention) comprises a pipe cutter wheel 101, an electric motor 102, a plurality of wire cleaning brushes 103, a gearing system 104, a frame 105, a left pipe driver 106, a right pipe driver 107, and a pipe channel 109.

The directional references of the invention 100 are as follows. The plurality of wire cleaning brushes 103 are accessible on what will be referred to as a front side 121 of the invention 100. The side distal to the front side 121 will be referred to as a rear side 122 of the invention 100. The invention 100 is essentially in the shape of a rectangular block that has a length 127, a height 128, and a width 129. The front side 121 is bounded by the length 127 and height 128 of the invention 100. The direction of the front face side 121 with the larger span is called the length 127 of the invention 100. The direction of the front side 121 with the smaller span is called the height 128 of the invention 100. The direction perpendicular to the length 127 and height 128 directions is the left pipe driver 106 and the right pipe driver 107 that is neither the front side 121 nor the rear side 122 is called the top side 123 of the invention 100. When facing the invention 100, the remaining sides in clockwise order are called a right side 126, a bottom side 124, and a left side 125.

The purpose of the gearing system 104 is to transmit the energy from the electric motor 102 to the plurality of wire cleaning brushes 103 and the left pipe driver 106 and the right pipe driver 107. The gearing system 104 comprises a plurality of gears and a plurality of drive chains. These gears are called, as viewed from the front and following a master drive chain 151 in a clockwise direction: the drive gear 130, a seventh gear 137, an eighth gear 138, a first gear 131, a second gear 132, a ninth idler gear 139, a tenth idler gear 140, a third gear 133, a fourth gear 134, a fifth gear 135 and a sixth gear 136.

The drive gear 130, the seventh gear 137, the eighth gear 138, the first gear 131, the second gear 132, the ninth idler gear 139, the tenth idler gear 140, the third gear 133, the fourth gear 134, the fifth gear 135 and the sixth gear 136 are all driven by the electric motor 102, which is directly connected to the drive gear 130 via a gear box 165. The gearbox 165 transforms a rotational speed of the electric motor 102 to a the art of gearboxes. The drive gear 130 is affixed to a gearbox output shaft 166 of the gearbox 165.

The drive gear 130 rotation is transferred through the use of the master drive chain 151. The master drive chain 151 is arranged around the gears so that when viewed from the front, the seventh gear 137, the ninth idler gear 139, the tenth idler gear 140, and the sixth gear 136 turn in the counter-clockwise direction. The remaining gears turn in the clockwise direction. The left drive chain 152 is used to transfer the rotation of the second gear 132 to the left pipe driver 106. The right drive chain 153 is used to transfer the rotation of the third gear 133 to the right pipe driver 107. The purpose of the ninth idler gear 139 and tenth idler gear 140 is to route the master drive chain 151 around the pipe channel 109. The gearing system 104 is mounted internally in the frame 105 and is not accessible when the invention 100 is in use. The plurality of gears are commercially available gears. The master drive chain 151, left drive chain 152 and right drive 153 chain are commercially available chains.

The purpose of the plurality of wire cleaning brushes 103 are to adaptively clean and debur pipes 300 after cutting. Moreover, the invention 100 is also adapted for use with pipe adaptors 301 (see FIG. 5). Each of the plurality of wire on the front side 121 and are attached directly to a gear using a shaft and a bushing. Each of the plurality of wire cleaning brushes 103 turn in the same direction as the gear it is attached to. In the first potential embodiment: the first wire brush 141 is attached to the first gear 131; the second wire brush 142 is attached to the second gear 132; the third wire brush 143 is attached to the third gear 133; the fourth wire brush 144 is attached to the fourth gear 134; the fifth wire brush 145 is attached to the fifth gear 135; the sixth wire brush 146 is attached to the sixth gear 136; the seventh wire brush 147 is attached to the seventh gear 137; and, the eighth wire brush 148 is attached to the eighth gear 138. The plurality of wire cleaning brushes 103 are commercially available.

The electric motor 102 is used to drive the gearing system 104. The electric motor 102 can be a commercially available electric motor selected to meet the power and torque design requirements of the system. Also associated with the electric motor 102 are a power cord 117 to supply the invention 100 with external electricity, a fuse 118, a pair of on-off switches 199, and other commercially available electrical components.

The pipe channel 109 comprises a front side port 110, a rear side port 111, a tape measure housing 112, a rear support and a tape measure 116. The purpose of the pipe channel 109 is to provide a structure to facilitate inserting the pipe 300 into the invention 100 so that the left pipe driver 106, right pipe driver 107 and the pipe cutter wheel 101 can cut the pipe 300. The pipe channel 109 comprises a front side port 110, a rear side port 111, the tape measure housing 112, a rear support 113, a front side pipe support 114, a rear side pipe support 115 and a tape measure 116.

The purpose of the front side port 110 and the rear side port 111 is to allow the pipe 300 to be inserted through the frame 105 to provide access to the pipe 300 for the pipe cutter wheel 101. The purpose of the rear support 113 is to support the pipe 300 as it is being cut. The top of the tape measure housing 112 is fitted with a front side pipe support 114. The front side pipe support 114 is a tube cut longitudinally into a semicircular shape. The purpose of the front side pipe support 114 is to keep the pipe 300 in position while allowing it to roll during cutting.

The top of the rear support 113 is fitted with a rear side pipe support 115. The rear side pipe support 115 is a tube cut longitudinally into a semicircular shape. The purpose of the rear side pipe support 115 is to keep the pipe 300 in position while allowing it to roll during cutting. With the exception 115, the pipe channel 109 is formed from metal components. The front side pipe support 114 and rear side pipe support 115 can be made of a metal coated with polytetrafluoroethylene or can be made of metal that is lubricated with oil during use.

The pair of on/off switches 199 are located on the rear side 122 of the frame 105. The pair of on/off switches 199 requires simultaneous depression in order to commence operation of the invention 100. Upon release of either or both of the pair of on/off switches 199, the invention 100 ceases to operate.

To insert the pipe 300 into the pipe channel 109, the release lever 119 (discussed elsewhere in this disclosure) is set so that the pipe cutter wheel 101 is moved out of the way. The pipe 300 is then adapted to be inserted from the rear side 122 through the rear side port 111 towards the front side port 110. The expectation is that the section of the pipe 300 extending away from the rear side 122 should be supported at the rear side of the invention 100. The purpose of the tape measure 116 is to reduce pipe bending during cutting should the section of the pipe 300 extending away from the front side 121 not be supported.

A commercially available pipe cutter wheel 101 is used in the invention 100. The pipe cutter wheel 101 is mounted internally in the frame 105 between the front side pipe support 114 and the rear side pipe support 115. The purpose of the pipe cutter wheel 101 is to actually cut the pipe 300. The pipe cutter 101 wheel is mounted in a locked structure that holds it in place. When the pipe 300 needs to be inserted into the pipe channel 109, a release lever 119 is used to unlock the structure containing the pipe cutter wheel 101 and move it out of the way of the pipe 300.

In order to be cut, the pipe 300 is rotated over the pipe cutter wheel 101 by the left pipe driver 106 and the right pipe driver 107. Once the pipe cutter wheel 101 is locked into place, the pipe cutter wheel 101 pushes the pipe 300 into the left pipe driver 106 and the right pipe driver 107. The left pipe driver 106 and the right pipe driver 107 then rotate the pipe 300 over the pipe cutter wheel 101 causing the pipe cutter wheel 101 to cut through the pipe 300. The left pipe driver 106 and right pipe driver 107 are commercially available rollers with a surface selected to have an adhesive quality (tack) to prevent slippage of the pipe 300.

The frame 105 is a metal structure that houses the elements of the invention 100. The frame 105 encloses the gearing system 104, the pipe cutter wheel 101 and portions of the left pipe driver 106 and the right pipe driver 107 to prevent injury during operation.

The invention 100 is intended to be portable. As such, it is fitted with a commercially available over shoulder carrying strap 155. The strap 155 is affixed to the frame 105 via at least one strap holder 157 provided on opposing sides of the frame 105. The invention 100 includes a leverage mechanism knob 156 that adjusts a leverage mechanism 177 located inside of the frame 105. The leverage mechanism 177 includes a leverage armature 178, which actuates a lateral armature 179, and which actuates the ninth idler gear 139. The lateral armature 179 is connected between the leverage armature 178 and the ninth idler gear 139. The ninth idler gear 139 is able to translate in order to adjust tension on the master drive chain 151. The leverage mechanism knob 156 rotates either clockwise or counterclockwise in order to raise or lower the leverage armature 178 thereby adjusting the ninth idler gear 139.

Figure 1:
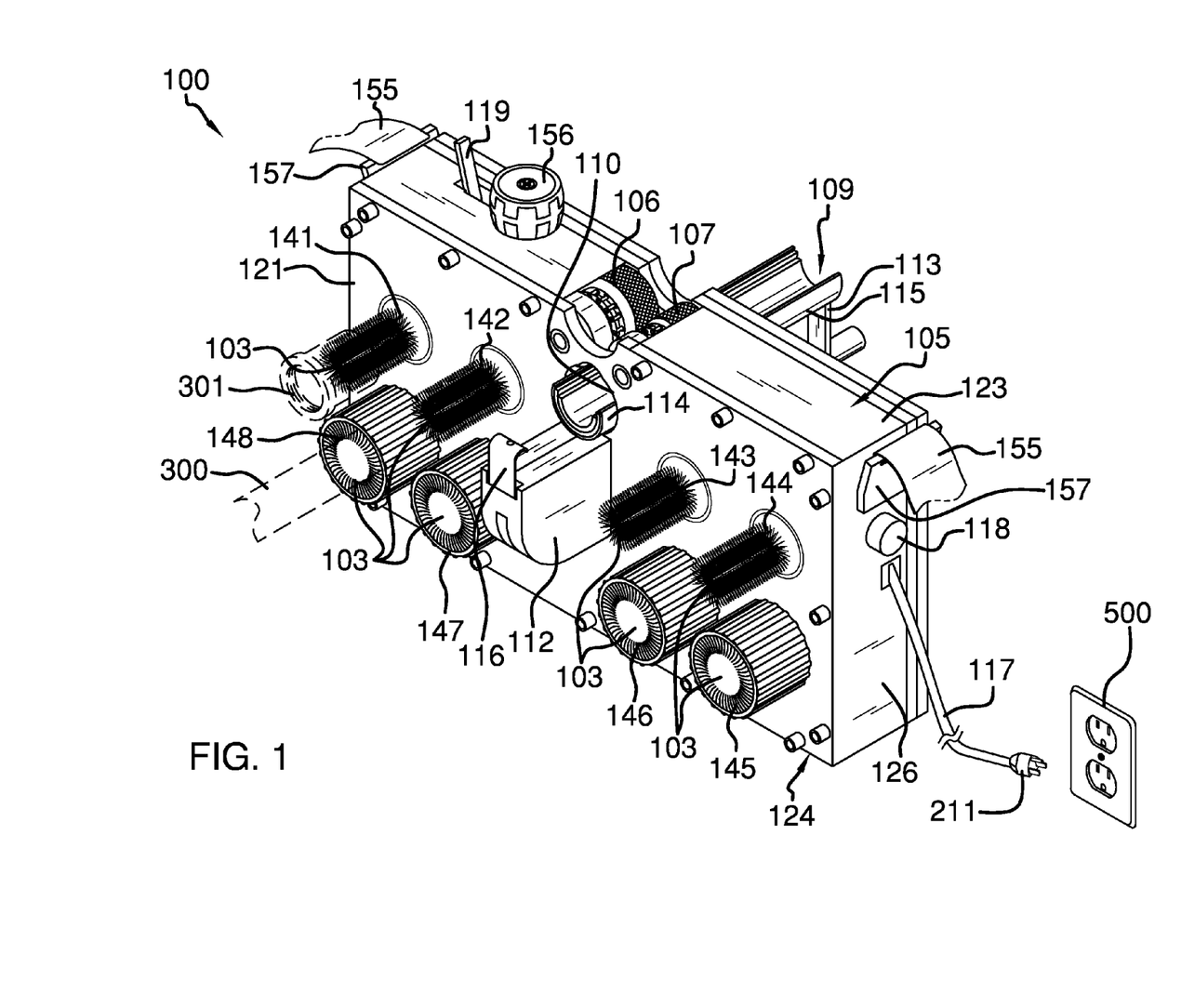
FIG. 1 is a perspective view of an embodiment of the disclosure.
Figure 2:
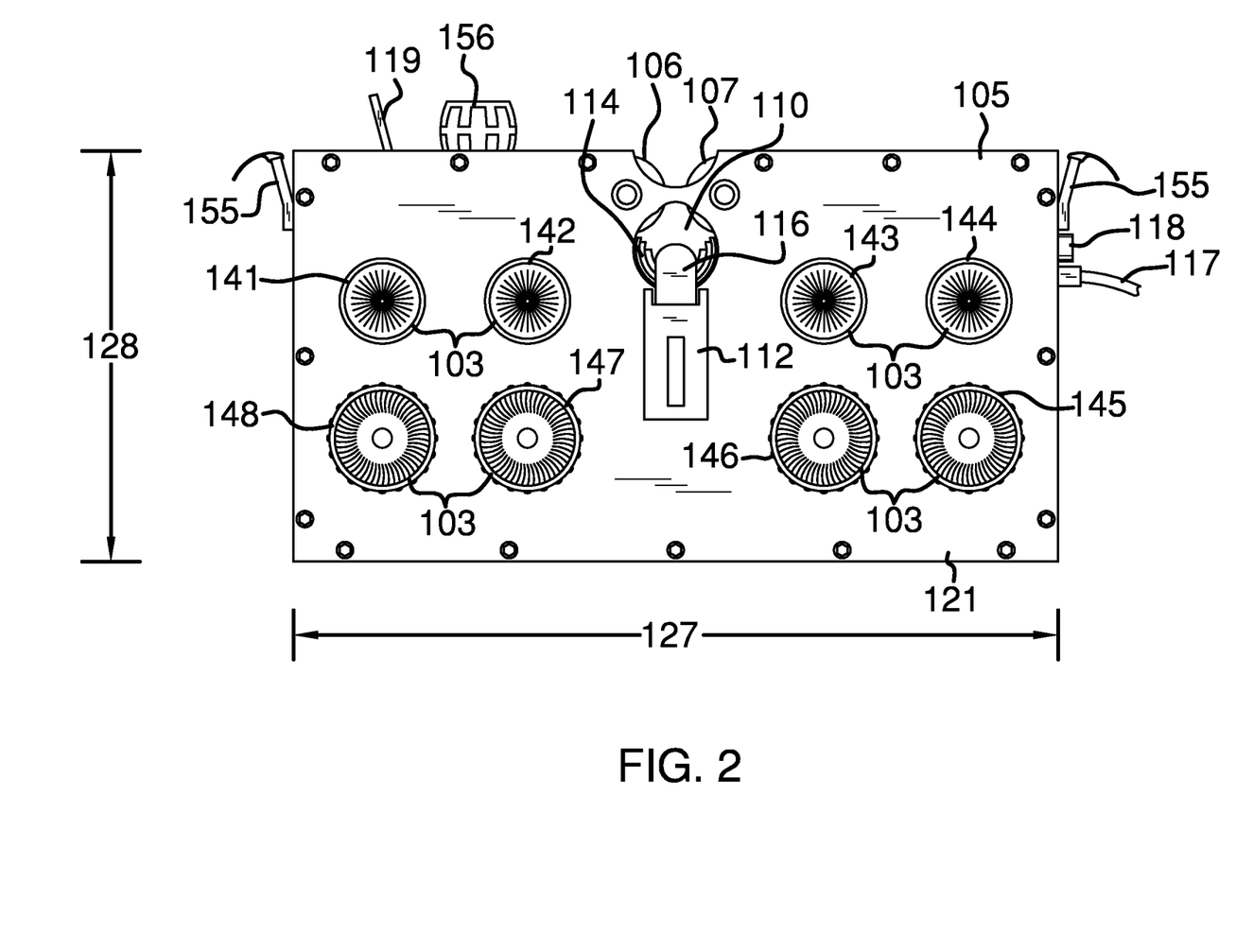
FIG. 2 is a front view of an embodiment of the disclosure.
Figure 3:
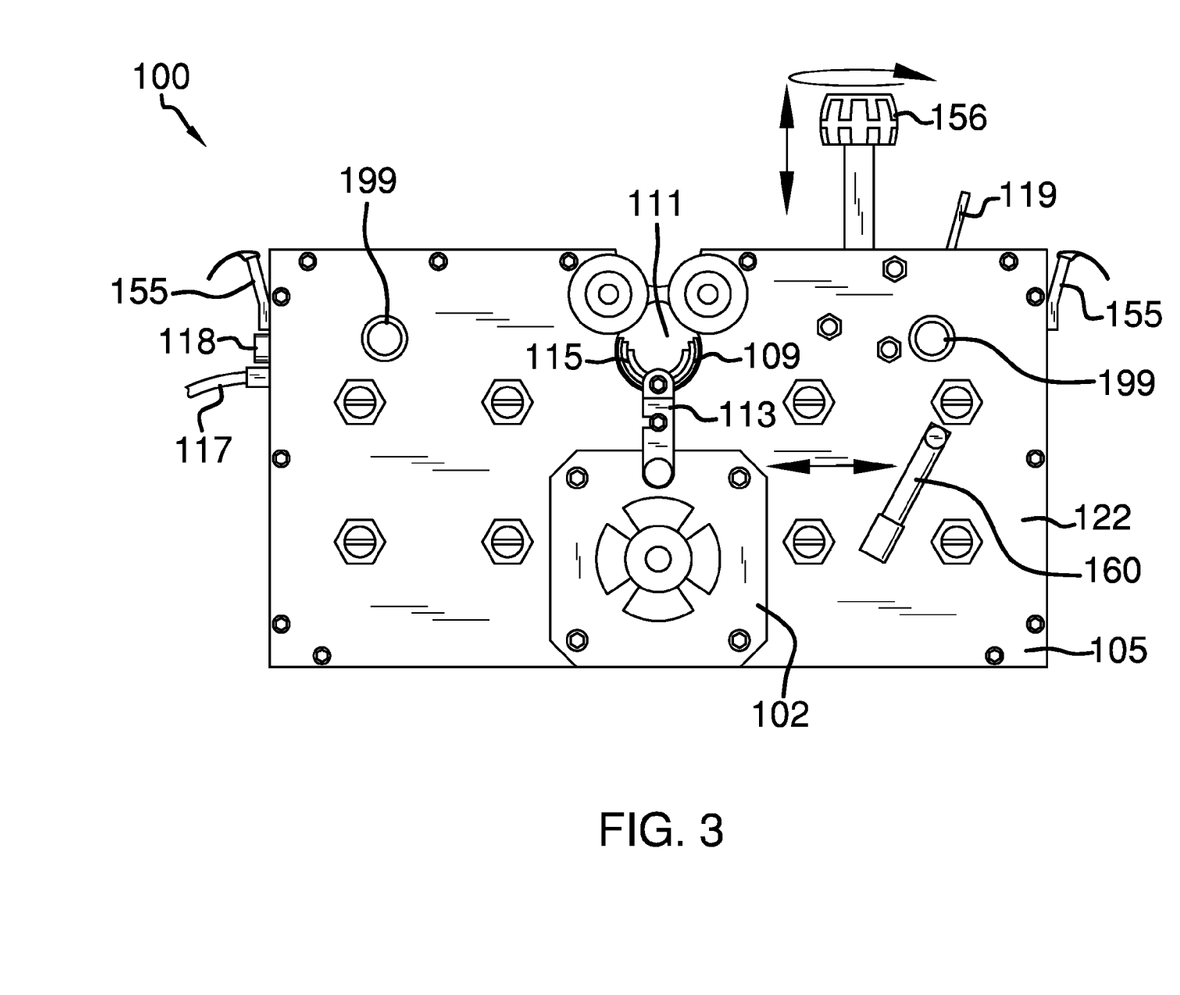
FIG. 3 is a rear view of an embodiment of the disclosure.
Figure 4:
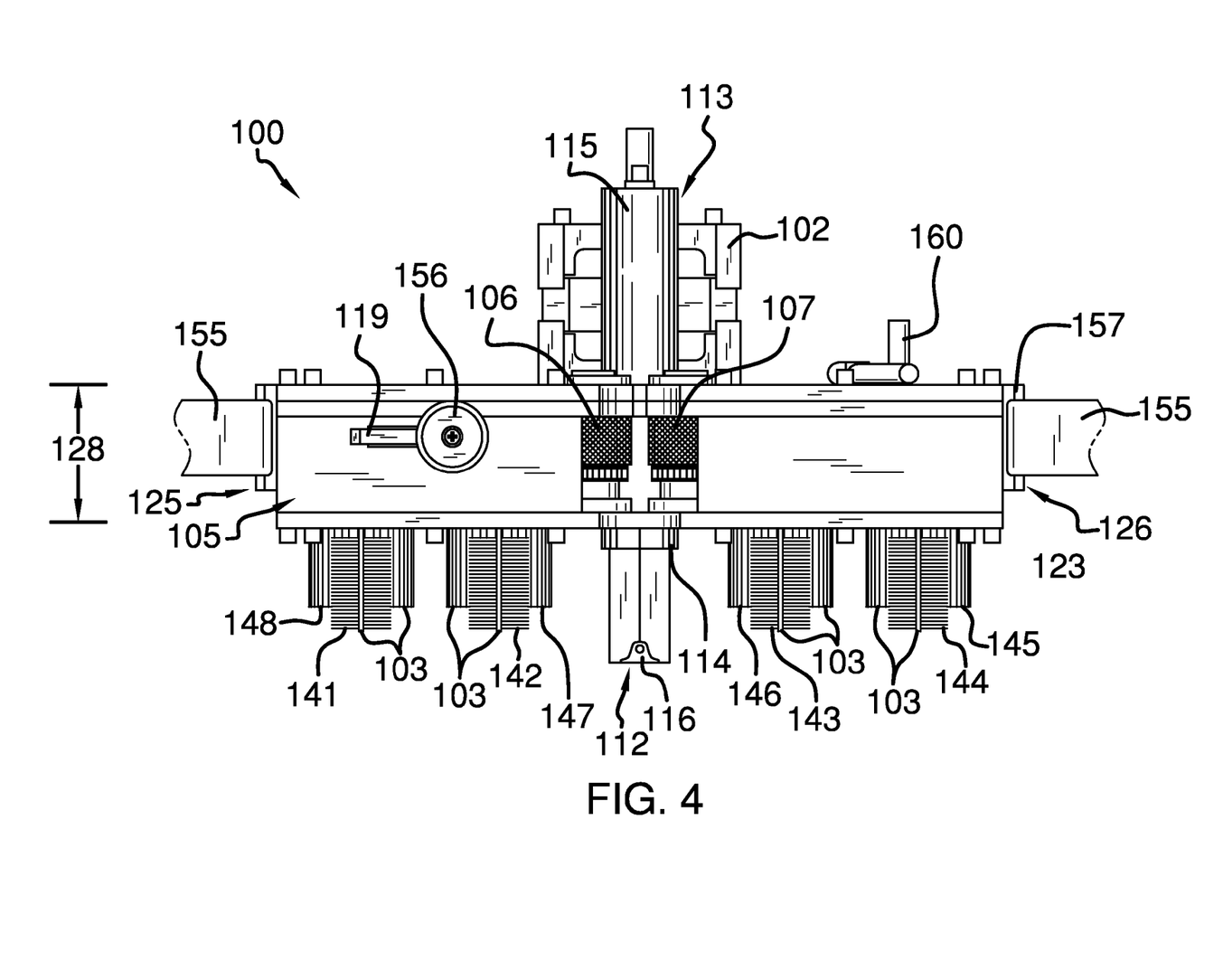
FIG. 4 is a top view of an embodiment of the disclosure.
Figure 5:
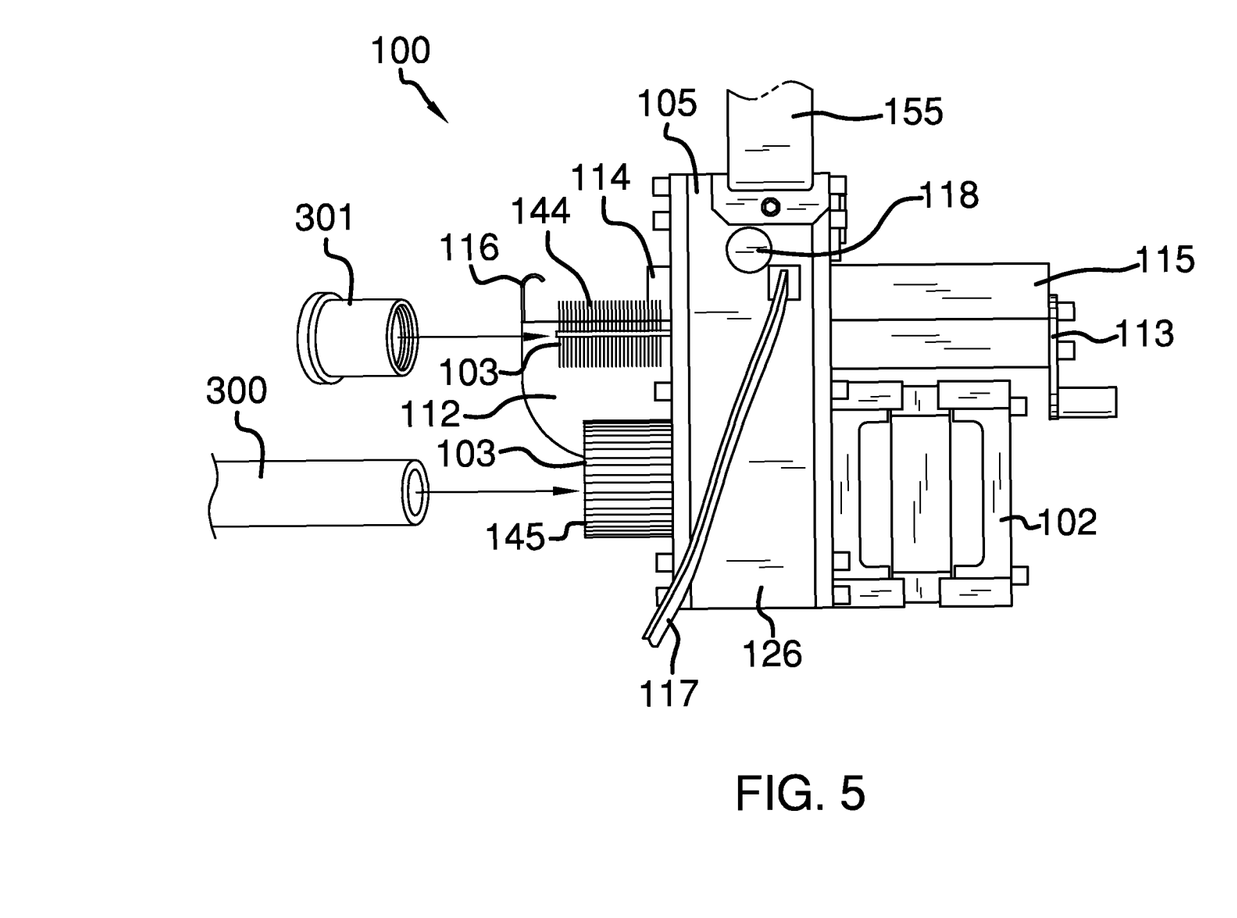
FIG. 5 is a side view of an embodiment of the disclosure.
Figure 6:
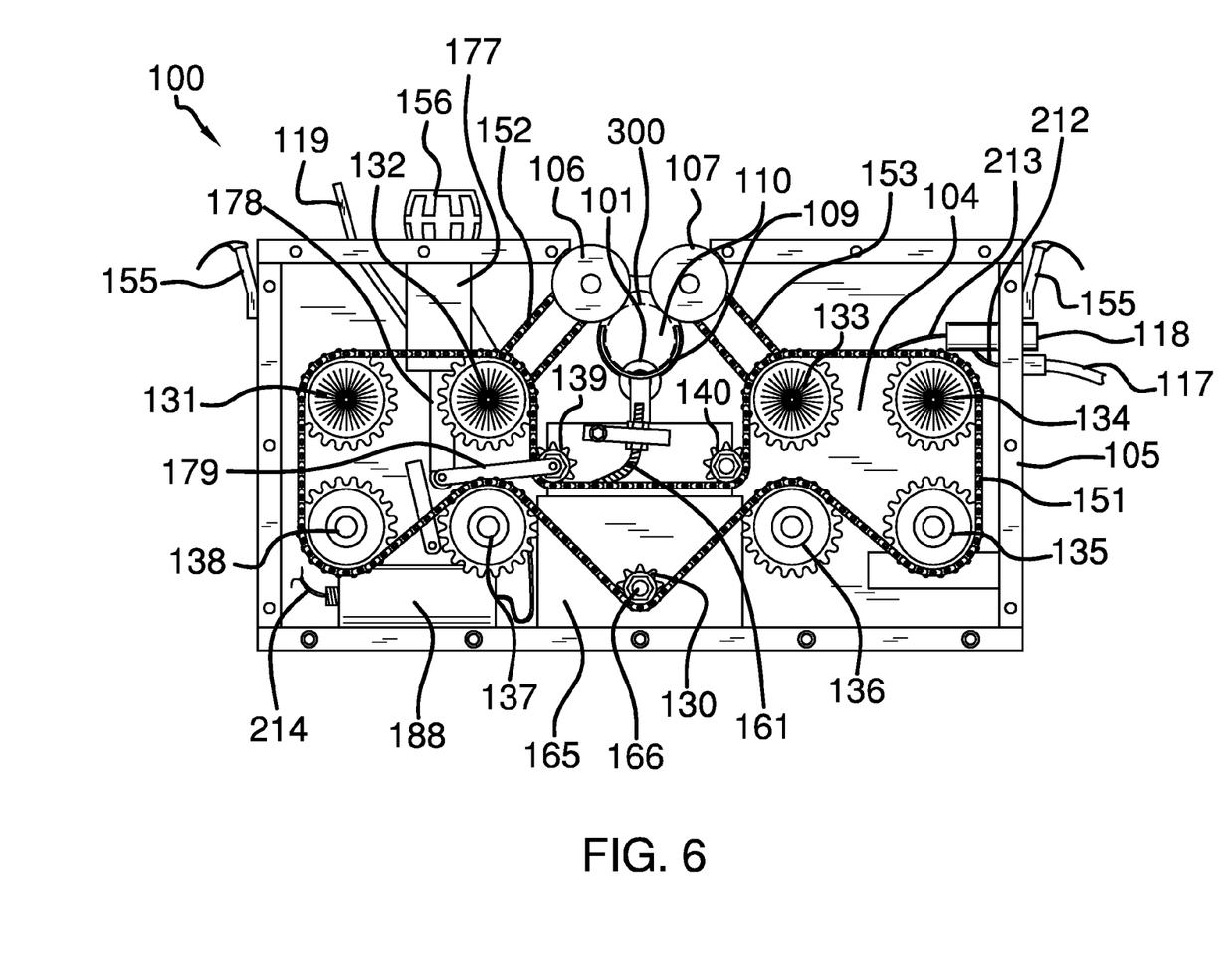
FIG. 6 is an internal view of an embodiment of the disclosure.

The invention 100 is used as follows: a pipe is laid on a surface with a first end of the pipe that extends beyond the surface. The release lever 119 is engaged which unlocks the position of the pipe cutter wheel 101. The first end of the pipe is inserted through the rear side port 111 through the invention 100 to the front side port 110. Once the pipe is positioned so that the intended cut line is placed over the position of the pipe cutter wheel 101 the release lever 119 is disengaged which locks the pipe cutter wheel 101 in cutting position. The electric motor 102 is then turned on which engages the gearing system 104. With the gearing system 104 engaged, the left pipe driver 106 and the right pipe driver 107 then rotate the pipe over the pipe cutter wheel 101 causing the pipe cutter wheel 101 to cut through the pipe. Once the pipe is cut, the end of the pipe can be cleaned and deburred using the rotating plurality of wire cleaning brushes 103. After use, the electric motor 102 would be turned off. Optionally, the electric motor 102 would be wired to a motor capacitor 188 that is located inside of the frame 105. The motor capacitor 188 is wired to the fuse 118, which in turn is wired to the power cord 117. The power cord 117 extends from the frame 105, and includes a plug 211, which is adapted to plug into a standard electrical outlet 500. Referring to FIG. 6, the power cord 117 includes a first wire 212 that extends over to the fuse 118. The fuse 118 has a second wire 213 that extends to the motor capacitor 188. The motor capacitor 188 has a third wire 214 that extends over to the electric motor 102. The on/off switches 199 are located in-line with the second wire 213 and the third wire 214.

Referring to FIG. 6, the invention 100 includes a pipe size selector 160 that is affixed to a cable 161 that extends over to the pipe cutter wheel 101 in order to adjust movement of the pipe cutter wheel 101 with respect to the pipe channel 109. Rotation of the pipe size selector 160 either pulls or releases the cable 161 in order to move the pipe cutter wheel 101 up or down within the pipe channel 109.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device that is adapted to cut, clean, and deburr a pipe comprising:
an electric motor in mechanical connection with a gearing system;
said gearing system is in mechanical connection with a pipe cutter wheel as well as a plurality of wire cleaning brushes;
said electric motor, and the gearing system, and the pipe cutter wheel, and the plurality of wire cleaning brushes are mounted inside of or secured to a frame;
said frame includes a left pipe driver, a right pipe driver, and a pipe channel;
wherein the pipe cutter wheel is adapted to cut a pipe;
wherein the plurality of wire cleaning brushes are adapted to brush said pipe or a pipe adaptor;
wherein the gearing system comprises a plurality of gears and a plurality of drive chains;
wherein the plurality of gears is further defined with a drive gear, a seventh gear, an eighth gear, a first gear, a second gear, a ninth idler gear, a tenth idler gear, a third gear, a fourth gear, a fifth gear, and a sixth gear;
wherein the plurality of drive chains is further defined with a master drive chain, a left drive chain, and a right drive chain.

2. The device according to claim 1 wherein the master drive chain is arranged around the plurality of gears; wherein the left drive chain is used to transfer the rotation of the second gear to the left pipe driver; wherein the right drive chain is used to transfer the rotation of the third gear to the right pipe driver; wherein the ninth idler gear and tenth idler gear route the master drive chain around the pipe channel; wherein the gearing system is mounted internally in the frame and is not accessible when the device is in use.

3. The device according to claim 2 wherein the purpose of the plurality of wire cleaning brushes is to adaptively clean and deburr pipes after cutting; wherein each of the plurality of wire cleaning brushes are mounted on the outside of the frame on the front side and are attached directly to the gearing system.

4. The device according to claim 3 wherein a first wire brush is attached to the first gear; a second wire brush is attached to the second gear; a third wire brush is attached to the third gear; a fourth wire brush is attached to the fourth gear; a fifth wire brush is attached to the fifth gear; a sixth wire brush is attached to the sixth gear; a seventh wire brush is attached to the seventh gear; a eighth wire brush is attached to the eighth gear.

5. The device according to claim 4 wherein the electric motor includes a power cord with a plug that is adapted to plug into a standard electrical outlet in order to supply electricity to the electric motor; wherein the power cord is wired to a fuse; wherein the fuse is wired to a motor capacitor; wherein the motor capacitor is wired to the electric motor.

6. The device according to claim 5 wherein the pipe channel comprises a front side port, a rear side port, a tape measure housing, a rear support, a front side pipe support, a rear side pipe support, and a tape measure; wherein the tape measure extends from the tape measure housing, and is adapted to measure a pipe to be cut via the device.

7. The device according to claim 6 wherein the front side port and the rear side port allow the pipe to be inserted through the frame in order for the pipe cutter wheel to cut the pipe; wherein the rear support is adapted to support the pipe as the pipe is being cut; wherein the front side pipe support is adapted to keep the pipe in position while allowing the pipe to roll during cutting.

8. The device according to claim 7 wherein the top of the rear support is fitted with a rear side pipe support; wherein the rear side pipe support is adapted to keep the pipe in position while allowing it to roll during cutting.

9. The device according to claim 8 wherein a pair of on/off switches are located on the rear side of the frame; wherein the pair of on/off switches requires simultaneous depression in order to commence operation of the electric motor; wherein upon release of either or both of the pair of on/off switches the electric motor stops running.

10. The device according to claim 9 wherein a release lever unlocks the pipe cutter wheel and moves the pipe cutter wheel in order to insert or extract the pipe; wherein once the pipe cutter wheel is locked into place, the pipe cutter wheel pushes the pipe into the left pipe driver and the right pipe driver; wherein the left pipe driver and the right pipe driver are adapted to rotate the pipe over the pipe cutter wheel causing the pipe cutter wheel to cut through the pipe.

11. The device according to claim 10 wherein a leverage mechanism knob that adjusts a leverage mechanism located inside of the frame; wherein the leverage mechanism includes a leverage armature, which actuates a lateral armature, and which actuates the ninth idler gear.

12. The device according to claim 11 wherein the lateral armature is connected between the leverage armature and the ninth idler gear; wherein the ninth idler gear is able to translate in order to adjust tension on the master drive chain.

13. The device according to claim 12 wherein the leverage mechanism knob rotates either clockwise or counterclockwise in order to raise or lower the leverage armature thereby adjusting the ninth idler gear.

14. The device according to claim 13 wherein the power cord includes a first wire that extends over to the fuse.

15. The device according to claim 14 wherein the fuse has a second wire that extends to the motor capacitor.

16. The device according to claim 15 wherein the motor capacitor has a third wire that extends over to the electric motor.

17. The device according to claim 16 wherein a pipe size selector is affixed to a cable that extends over to the pipe cutter wheel in order to adjust movement of the pipe cutter wheel with respect to the pipe channel; wherein rotation of the pipe size selector either pulls or releases the cable in order to move the pipe cutter wheel up or down within the pipe channel in order to adaptively adjust a size to cut said pipe.

* * * * *